United States Patent
Yoshikawa

(10) Patent No.: US 8,378,525 B2
(45) Date of Patent: Feb. 19, 2013

(54) POWER TRANSFER APPARATUS

(75) Inventor: Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 345 days.

(21) Appl. No.: 12/750,672

(22) Filed: Mar. 30, 2010

(65) Prior Publication Data

US 2010/0244582 A1 Sep. 30, 2010

(30) Foreign Application Priority Data

Mar. 31, 2009 (JP) .................................. 2009-088396

(51) Int. Cl.
*H01F 27/42* (2006.01)
(52) U.S. Cl. ........................................................ 307/104
(58) Field of Classification Search .................... 307/104
See application file for complete search history.

(56) References Cited

U.S. PATENT DOCUMENTS

| 6,163,242 A | 12/2000 | Crewson | |
|---|---|---|---|
| 8,072,304 B2 * | 12/2011 | Kato et al. | ...................... 336/200 |
| 8,072,305 B2 * | 12/2011 | Nakahori | ...................... 336/200 |
| 2003/0020583 A1 * | 1/2003 | Hui et al. | ...................... 336/200 |
| 2007/0222542 A1 | 9/2007 | Joannopoulos | |
| 2008/0266748 A1 | 10/2008 | Lee | |
| 2008/0278264 A1 | 11/2008 | Karalis | |
| 2009/0212637 A1 * | 8/2009 | Baarman et al. | ............... 307/104 |
| 2010/0007215 A1 * | 1/2010 | Sakuma | ......................... 307/104 |
| 2011/0309685 A9 * | 12/2011 | Cook et al. | ..................... 307/104 |

FOREIGN PATENT DOCUMENTS

| JP | 2002-544756 A | 12/2002 |
|---|---|---|
| JP | 2006-230129 A | 8/2006 |
| JP | 2008-508842 A | 3/2008 |
| JP | 2008-160312 A | 7/2008 |
| JP | 2008-301918 A | 12/2008 |
| JP | 2009-501510 A | 1/2009 |
| WO | WO-00/69231 | 11/2000 |
| WO | WO-2006/011769 | 2/2006 |
| WO | WO-2007/008646 | 1/2007 |

OTHER PUBLICATIONS

Author Unknown, "Ferrite Sheet", http://panasonic.biz/ipv6/tech/004fs.html panasonic u-Sheet.

* cited by examiner

*Primary Examiner* — Daniel Cavallari
(74) *Attorney, Agent, or Firm* — Fujitsu Patent Center

(57) ABSTRACT

A power transfer apparatus includes: a magnetic resonance coil for transferring magnetic energy by magnetically resonating with an external coil; a power receiving unit for picking up, as electrical power, the magnetic energy that the magnetic resonance coil receives from the external coil; and a magnetic body arranged on a side of the magnetic resonance coil opposite a transfer side of the magnetic energy of the magnetic resonance coil.

14 Claims, 16 Drawing Sheets

POWER TRANSFER APPARATUS

CROSS-REFERENCE TO RELATED APPLICATIONS

This application is based upon and claims the benefit of priority of the prior Japanese Patent Application No. 2009-88396, filed on Mar. 31, 2009, the entire contents of which are incorporated herein by reference.

FIELD

The present invention relates to a power transfer apparatus that transfers power through magnetic resonance.

BACKGROUND

Japanese Laid-open Patent Publication No. 2006-230129 discusses a technique of supplying power in a wireless fashion through electromagnetic induction. Japanese Laid-open Patent Publication Nos. 2008-301918 and 2008-160312 discuss a technique of supplying power in a wireless fashion using radio waves. Japanese Laid-open Patent Publication No. 2009-501510 discusses a technique of supplying power through magnetic resonance. Magnetic resonance refers to a physical principle in which magnetic fields are coupled between two resonating coils to transfer energy.

SUMMARY

According to an aspect of the invention, a power transfer apparatus includes: a magnetic resonance coil for transferring magnetic energy by magnetically resonating with an external coil; a power receiving unit for picking up, as electrical power, the magnetic energy that the magnetic resonance coil receives from the external coil; and a magnetic body arranged on a side of the magnetic resonance coil opposite a transfer side of the magnetic energy of the magnetic resonance coil.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Power transfer efficiency increases in the wireless transmission of power based on an increase in magnetic resonance when the degree of magnetic coupling increases between two coils. Increasing the degree of magnetic coupling between the coils is desirable.

The magnetic fields generated by two coils have respective directivity patterns. The magnetic field is also generated in a direction other than a direction of magnetic energy transfer between opposed coils. Such a magnetic field may give rise to an adverse effect on surrounding objects. It is likely that a structure may be present in a direction other than a direction of magnetic energy transfer. If any electrically conductive material is included in such a structure, eddy currents occur in the electrically conductive material, leading to an energy loss.

A power transfer apparatus of the embodiment includes a magnetic resonance coil for transferring magnetic energy by electromagnetically resonating with external coils and a magnetic body arranged on a side of the magnetic resonance coil opposite the magnetic energy transfer side of the magnetic resonance coil.

The power transfer apparatus of the embodiment results in increased transfer efficiency in the wireless transfer of power based on magnetic resonance and controls adverse effects of the magnetic field on the environment.

Figure 1:
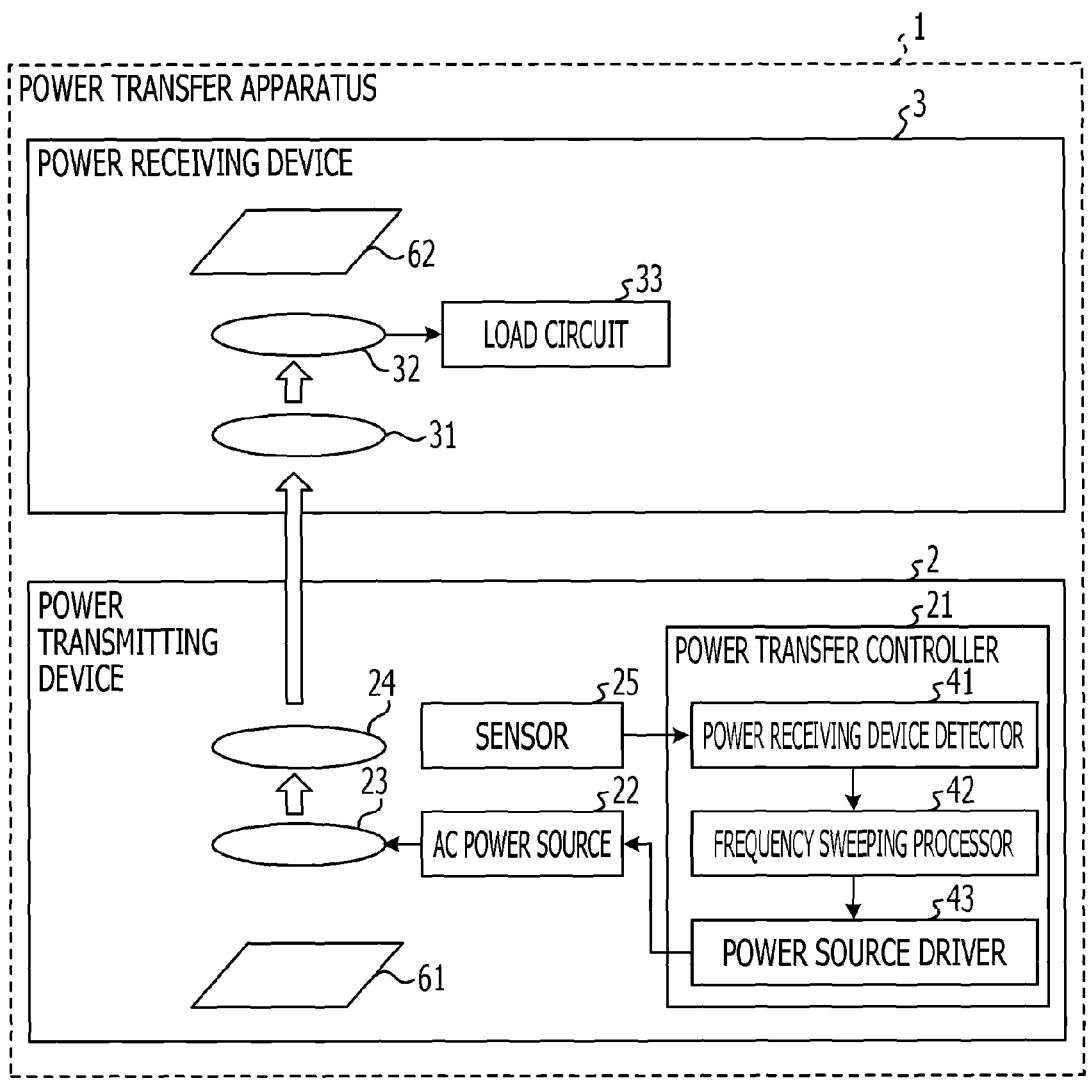
FIG. 1 diagrammatically illustrates a power transceiver apparatus in accordance with one embodiment.

FIG. 1 is a configuration diagram of a power transfer apparatus 1 of the embodiment. The power transfer apparatus 1 illustrated in FIG. 1 is a wireless power transfer system including a power transmitting device 2 and a power receiving device 3. Each of the power transmitting device 2 and the power receiving device 3 is a power transfer apparatus, and electrical power is transferred from the power transmitting device 2 to the power receiving device 3.

The power transmitting device 2 includes a power transfer controller 21, an AC power source 22, a power supplying coil 23, a power transmitting coil 24, a sensor 25, and a magnetic body 61. The power receiving device 3 includes a power receiving coil 31, a power pickup coil 32, a load circuit 33, and a magnetic body 62.

Each of the power transmitting coil 24 and the power receiving coil 31 is an LC resonance circuit and serves as a magnetic resonance coil. A capacitance component of the LC resonance circuit may be implemented by an element or a stray capacitance with both ends of each coil left opened. Let L represent an inductance component and C represent a capacitance component in the LC resonance circuit, and a resonance frequency f is determined in equation (1):

$$f = \frac{1}{2\pi\sqrt{LC}} \qquad (1)$$

If the resonance frequency of the power transmitting coil 24 is close enough to the resonance frequency of the power receiving coil 31 with an appropriately short distance between the power transmitting coil 24 and the power receiving coil 31, magnetic resonance occurs therebetween.

If magnetic resonance occurs with the power transmitting coil 24 in a resonance state, magnetic energy is transferred from the power transmitting coil 24 to the power receiving coil 31.

The power supplying coil 23 serves as a power transmitting and receiving unit that supplies power from the AC power source 22 to the power transmitting coil 24 through electromagnetic induction. The power supplying coil 23 and the power transmitting coil 24 are arranged at a position and a distance therebetween in a manner such that electromagnetic induction occurs. By causing the power transmitting coil 24 to resonate through electromagnetic induction via the power supplying coil 23, the power transmitting coil 24 may need no electrical connection with another circuit. The power transmitting coil 24 may thus be designed to have any resonance frequency with high precision.

The power pickup coil 32 is installed at a location that allows the power pickup coil 32 to be in electromagnetic induction with the power receiving coil 31. If the power receiving coil 31 resonates through electromagnetic induction, energy is transferred from the power receiving coil 31 to the power pickup coil 32 through electromagnetic induction. The power pickup coil 32, electrically connected to a load circuit 33, supplies energy received thereby through electromagnetic induction to the load circuit 33 as electrical power. The power pickup coil 32 serves as an electrical power receiving device. The load circuit 33 may be any circuit such as a rectifier circuit or a battery connected to a charging circuit.

Since electrical power is picked up from the power receiving coil 31 via the power pickup coil 32, the power receiving coil 31 may need no electrical connection with any other circuit. The power receiving coil 31 may thus be designed to have any resonance frequency with high precision.

The AC power source 22 outputs an AC current at a frequency and an amplitude specified by the power transfer controller 21. The frequency of the AC power source 22 is hereinafter referred to as a drive frequency. The power supplying coil 23, electrically connected to the AC power source 22, vibrates at the drive frequency. The power transmitting coil 24 resonates at the drive frequency. Similarly, the power receiving coil 31 also resonates at the drive frequency.

In the power transfer apparatus 1, the electrical power of the AC power source 22 is supplied to the load circuit 33 through electromagnetic induction between the power supplying coil 23 and the power transmitting coil 24, magnetic resonance between the power transmitting coil 24 and the power receiving coil 31, and electromagnetic induction between the power receiving coil 31 and the power pickup coil 32.

The power transfer efficiency through magnetic resonance between the power transmitting coil 24 and the power receiving coil 31 depends on a performance factor determined by equation (2):

$$f = \frac{K}{\sqrt{\Gamma_1 \Gamma_2}} \qquad (2)$$

where K represents the magnitude of energy current per unit time, i.e., a coupling efficiency representing the degree of magnetic coupling between the two coils, $\Gamma_1$ represents an energy loss of the power transmitting coil 24 per unit time, and $\Gamma_2$ represents an energy loss of the power receiving coil 31 per unit time.

If the coupling efficiency K is increased, the power transfer efficiency through magnetic resonance is also increased. The power transmitting device 2 and the power receiving device 3 include magnetic bodies in the vicinity of magnetic resonance coils in order to impart directivity to the magnetic fields. The magnetic field with directivity is effective to increase the power transfer efficiency. The magnetic field generated in the resonance coil in the power transmitting device increases in intensity in the power receiving device. Similarly, the magnetic field generated in the resonance coil in the power receiving device increases in intensity in the power transmitting device. The coupling efficiency K is thus increased.

Figure 2:
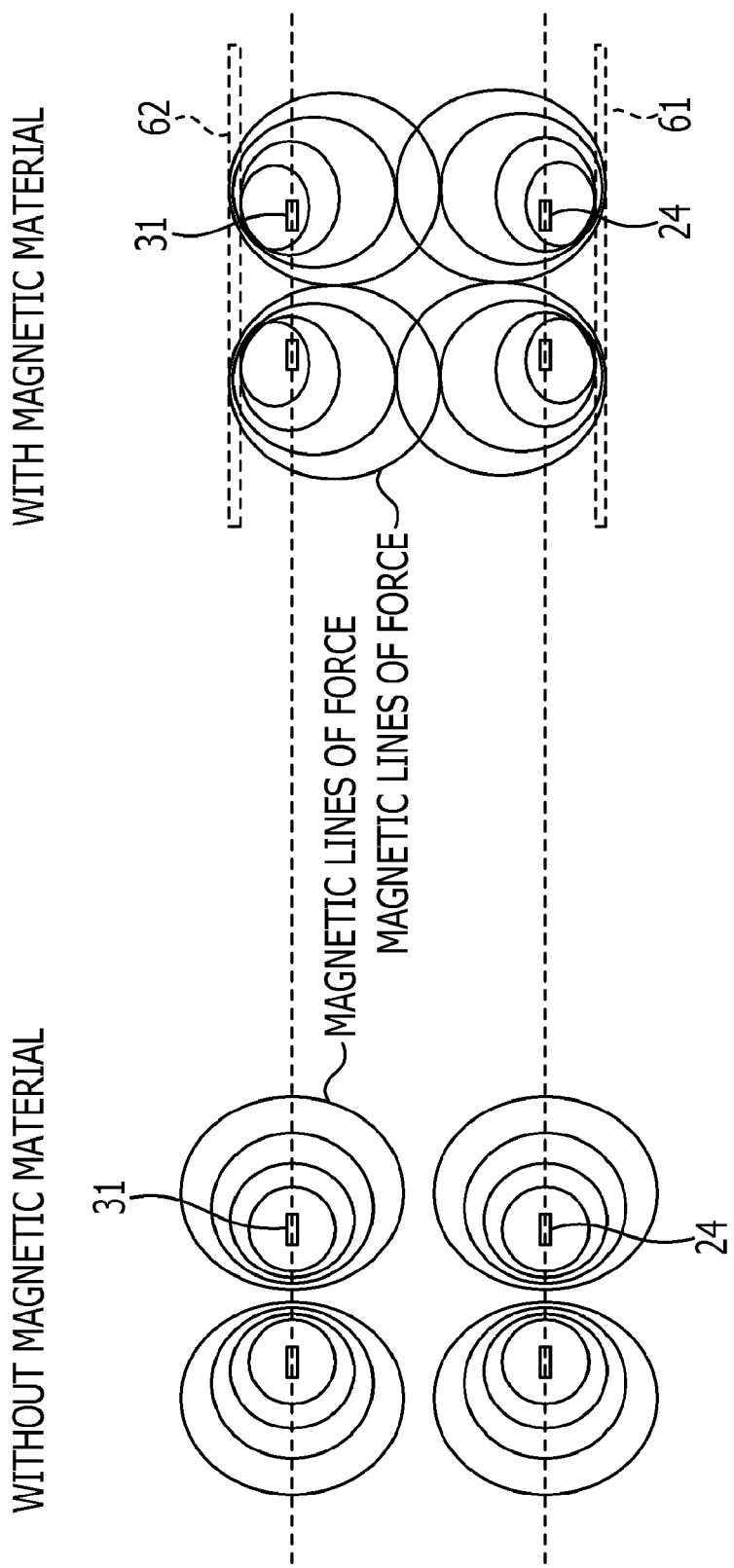
FIG. 2 illustrates a change in a magnetic field occurring in response to the placement of a magnetic body and a magnetic field distribution in a coil cross-section.

FIG. 2 illustrates the directivity of each magnetic field generated in response to the geometry of the magnetic bodies. If the magnetic body 61 is arranged close to the power transmitting coil 24 as illustrated in FIG. 2, the power transmitting coil 24 generates a magnetic field having a higher directivity in a direction opposite the magnetic body 61. The intensity of the magnetic field becomes stronger in the direction opposite the magnetic body 61. Similarly, if the magnetic body 62 is arranged close to the power receiving coil 31, the power receiving coil 31 generates a magnetic field having a higher directivity in a direction opposite the magnetic body 62. The intensity of the magnetic field becomes stronger in the direction opposite the magnetic body 62.

The magnetic bodies 61 and 62 are arranged so that a higher directivity portion of the power transmitting coil 24 faces a higher directivity portion of the power receiving coil 31. In other words, the magnetic bodies 61 and 62 are respectively arranged on the sides of the power transmitting coil 24 and the power receiving coil 31 opposite the energy transfer sides thereof.

The coupling efficiency K of the magnetic fields of the power transmitting coil 24 and the power receiving coil 31 increases by arranging the magnetic bodies 61 and 62 in this way. In comparison with a structure having no magnetic bodies 61 and 62, the power transfer efficiency is large. The power transmitting coil 24 and the power receiving coil 31 having directivity weaken the magnetic fields thereof in a direction other than the magnetic energy transfer direction, and reduce adverse effects of the magnetic fields on the surrounding buildings.

With reference back to FIG. 1, the sensor 25 measures the intensity of the magnetic field in the vicinity of the power transmitting coil 24 and outputs a current responsive to the intensity of the magnetic field. The power transfer controller 21 includes a power receiving device detector 41, a frequency sweeping processor 42, and a power source driver 43.

The power receiving device detector 41 detects that the power receiving device 3 is close enough to receive wireless power being supplied from the AC power source 22. The power transmitting coil 24 resonates, driven with a constant frequency and an amplitude by the AC power source 22. In this case, the shorter the distance between the power transmitting coil 24 and the power receiving coil 31 is, the stronger the magnetic energy transmitted by the power transmitting coil 24 through magnetic resonance becomes. The sensor 25 measures the intensity of the magnetic field in the vicinity of the sensor 25 with the AC power source 22 operated with a constant frequency and an amplitude. The sensor 25 may thus detect the closeness of the power receiving coil 31, i.e., the power receiving device 3. More specifically, when the output current value of the sensor 25 exceeds a threshold value Th, the power receiving device detector 41 provides an output indicating that the power receiving device 3 has been detected.

The frequency sweeping processor 42 acquires a change in the output of the sensor 25 by sweeping the drive frequency thereof. The drive frequency sweeps within a given range. The output current of the sensor 25 indicates the intensity of the magnetic field in the vicinity of the power transmitting coil 24. The closer the power receiving coil 31 is located to the power transmitting coil 24, i.e., the higher the power transfer efficiency, the higher the output current of the sensor 25 becomes. Process results of the frequency sweeping processor 42 thus indicate a distribution of the power transfer efficiency with respect to the drive frequency.

From the frequency sweep results, the power source driver 43 selects a drive frequency providing the highest power transfer efficiency, and drives the AC power source 22 on that drive frequency. Energy transfer is thus performed between the power transmitting coil 24 and the power receiving coil 31.

Figure 3:
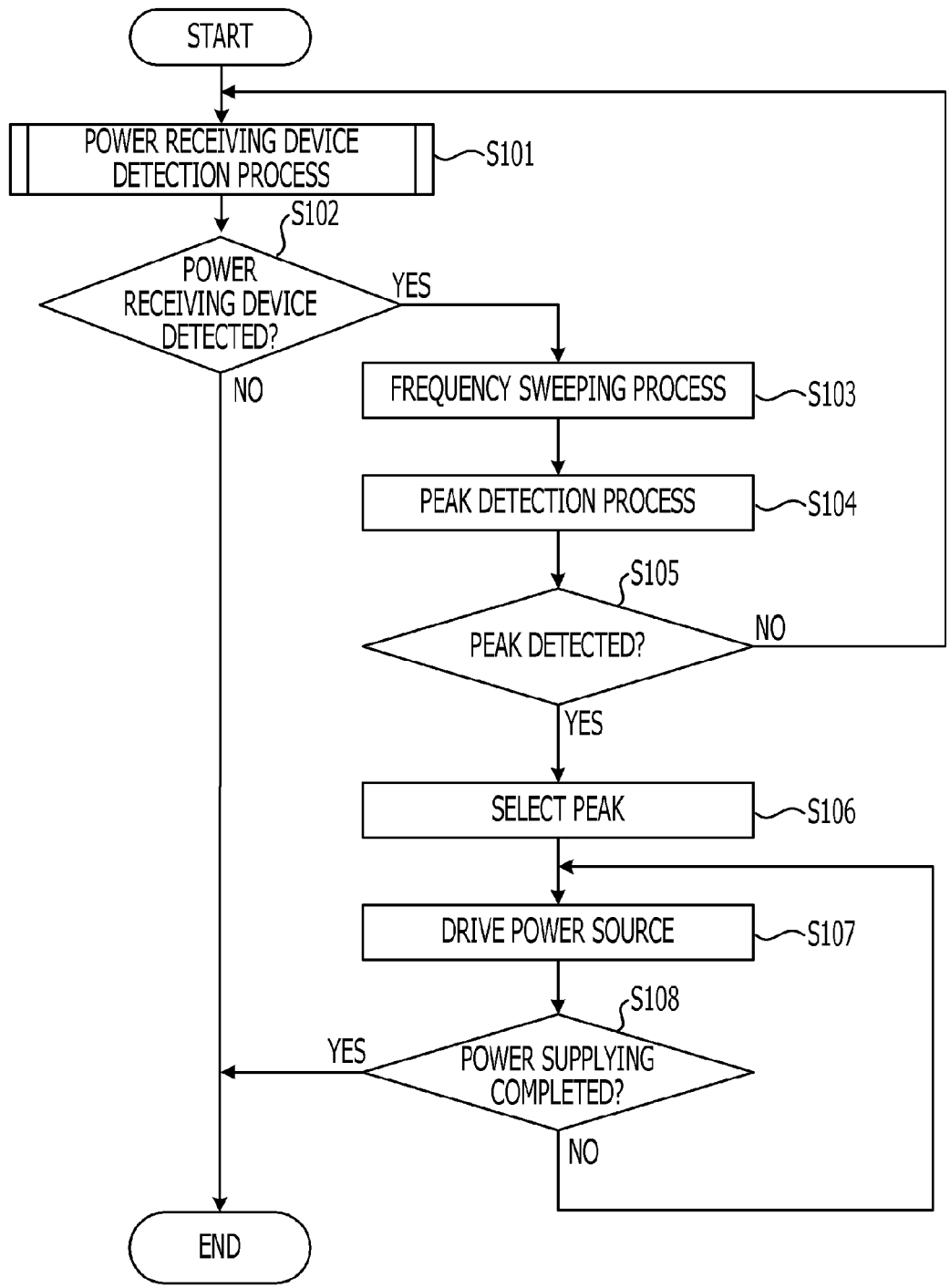
FIG. 3 is a flowchart illustrating a process of a power transmission controller.

FIG. 3 is a flowchart illustrating a process of the power transfer controller 21. The power transfer controller 21 periodically performs the process illustrated in FIG. 4. The power receiving device detector 41 first performs a power receiving device detection process (S101).

If no power receiving device detection output is provided in the power receiving device detection process (NO in S102), the power transfer controller 21 ends the process. If a power receiving device detection output is provided in the power receiving device detection process (YES in S102), the frequency sweeping processor 42 performs a frequency sweep process (S103). The frequency sweeping processor 42 performs a peak detection process to detect a peak of the distribution of the power transfer efficiency with respect to the drive frequency obtained as a result of the frequency sweep process (S104).

If no peak is detected from the power transfer efficiency through the peak detection process (NO in S105), processing returns to the power receiving device detection process of the power receiving device detector 41 (S101). If a peak is detected from the power transfer efficiency distribution (YES in S105), the power source driver 43 selects a drive frequency at the peak (S106), drives the AC power source 22 on the drive frequency (S107), and causes magnetic resonance between the power transmitting coil 24 and the power receiving coil 31 to supply power to the power receiving device 3.

If a condition to end the power supplying is satisfied (YES in S108), the power transfer controller 21 stops power supplying and ends the process. The conditions to end the power supplying may include an input of an instruction to end the power supplying, a power transfer efficiency dropped below a given value, etc. If the condition to end the power supplying is not satisfied (NO in S108), power driving continues (S107) to supply power.

Figure 4:
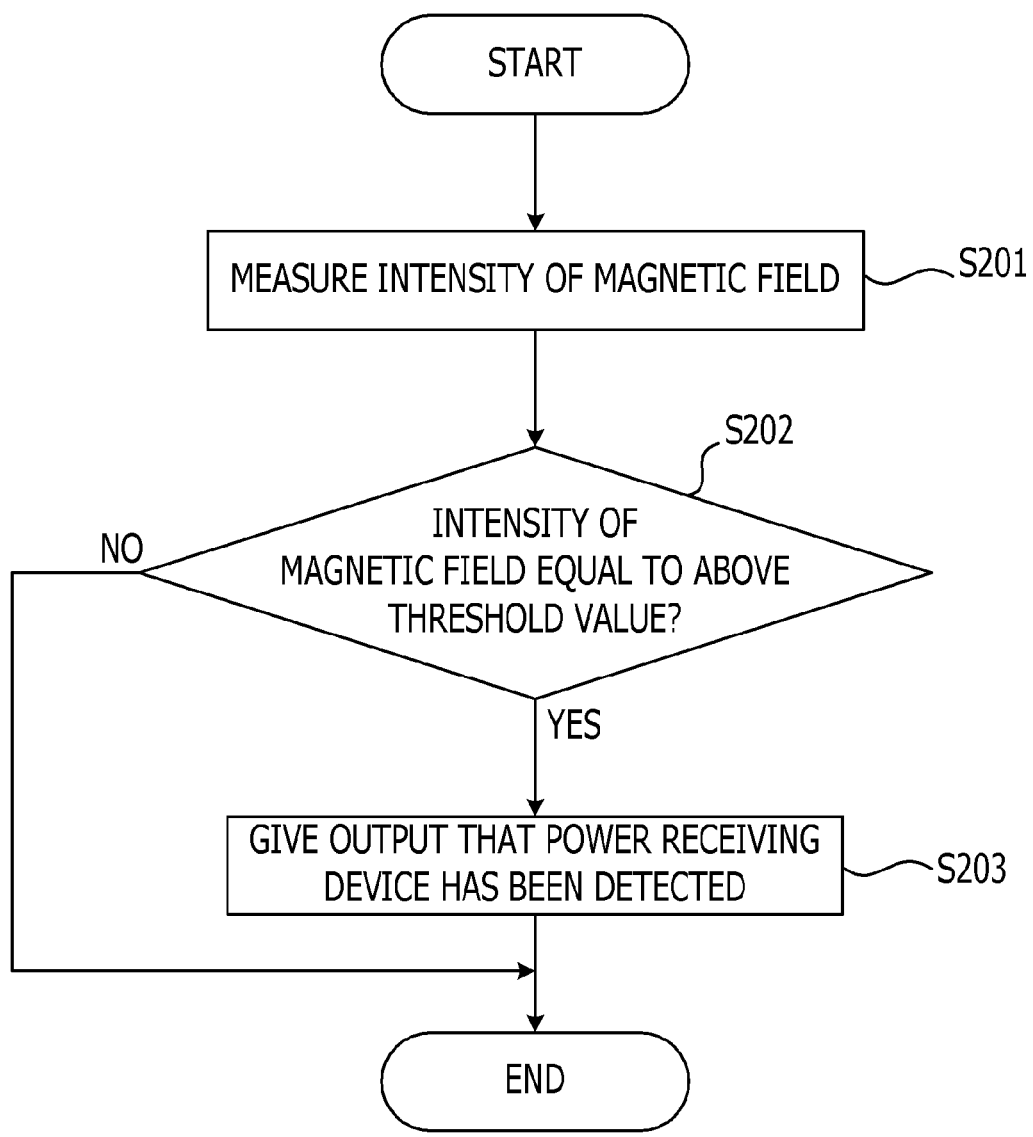
FIG. 4 is a flowchart illustrating in detail a power receiving device detection process.

FIG. 4 is a flowchart illustrating in detail the power receiving device detection process. When the power receiving device detection process starts, the sensor 25 measures the intensity of the magnetic field (S201), and the power receiving device detector 41 determines whether the intensity of the magnetic field is equal to or higher than a threshold value (S202). The intensity of the magnetic field is obtained as a current value output from the sensor 25. The power receiving device detector 41 determines the intensity of the magnetic field by comparing the current value with the threshold value.

If determination results of the power receiving device detector 41 indicates that the magnetic field intensity is lower than the threshold value (NO in S202), the power receiving device detector 41 ends the power receiving device detection process. If the magnetic field intensity is equal to or higher than the threshold value (YES in S202), the power receiving device detector 41 outputs a power receiving device detection output (S203), and ends the process.

FIG. 4 illustrates only an example of the power receiving device detection process. Any technique may be used to detect proximity of the power receiving device 3. For example, an optical sensor may be used to detect the power receiving device 3. In the detection of magnetic resonance, the output of the AC power source 22 may be set to be lower in the power receiving device detection process than when the power supplying is performed.

Examples of the geometry of the magnetic bodies 61 and 62 are described with reference to FIGS. 5-13. FIGS. 5-13 illustrate cross sections of the magnetic bodies, the magnetic resonance coils, and the electromagnetic induction coils. As previously discussed, the magnetic body 61 is arranged opposite the magnetic energy transfer side of the power transmitting coil 24. The magnetic body 61 is also arranged opposite the magnetic energy transfer side as seen from the power supplying coil 23. The magnetic body 61 is arranged in this way because, if arranged between the power supplying coil 23 and the power transmitting coil 24, the magnetic body 61 would interfere with electromagnetic induction. Similarly, the magnetic body 62 is arranged opposite the magnetic energy transfer side as seen from the power receiving coil 31 and the power pickup coil 32.

Figure 5:
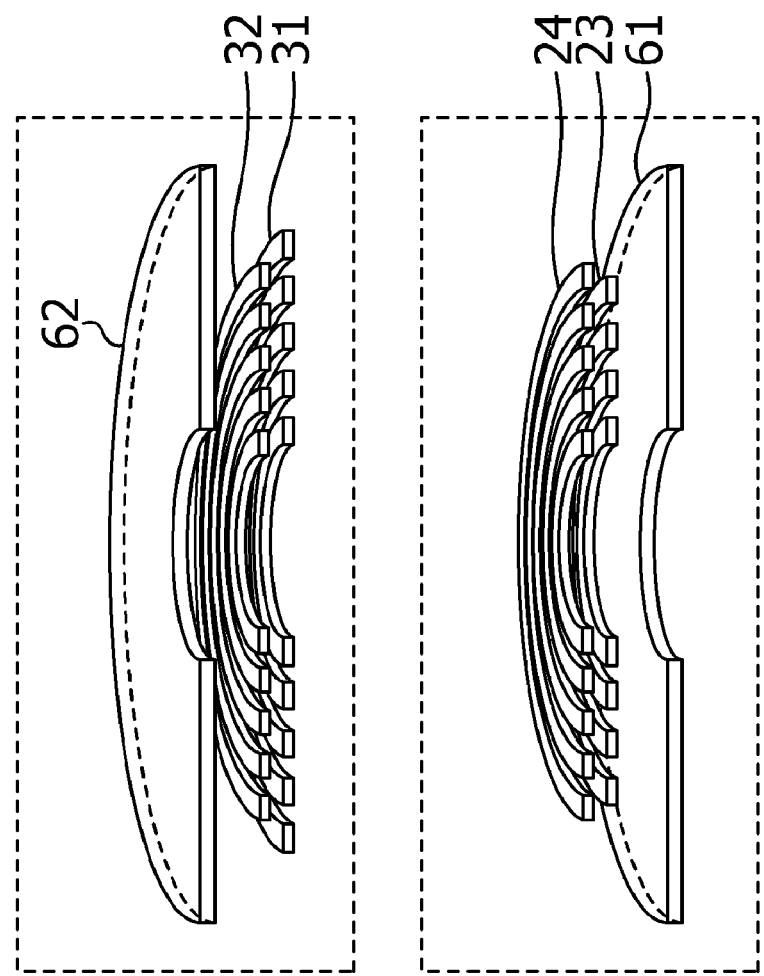
FIG. 5 illustrates a structure including an electromagnetic induction coil mounted between a disk magnetic body having an opening and a magnetic resonance coil.

FIG. 5 illustrates a structure in which an electromagnetic induction coil between a magnetic disk having an aperture and a magnetic resonance coil. Referring to FIG. 5, the magnetic bodies 61 and 62 are disks having an aperture in the center thereof. The power transmitting coil 24 and the power receiving coil 31, as the electromagnetic induction coils, are arranged diagonally across from each other coils.

Referring to FIG. 5, the magnetic body 61 is arranged opposite the power receiving coil 31, as seen from the power transmitting coil 24, and parallel to the coil surface of the power transmitting coil 24. The power supplying coil 23 as an electromagnetic induction coil is arranged between the power transmitting coil 24 and the magnetic body 61. The magnetic body 62 is arranged opposite the power transmitting coil 24 as seen from the power receiving coil 31 and parallel to the coil surface of the power receiving coil 31. The power pickup coil 32 as an electromagnetic induction coil is arranged between the power receiving coil 31 and the magnetic body 62.

Figure 6:
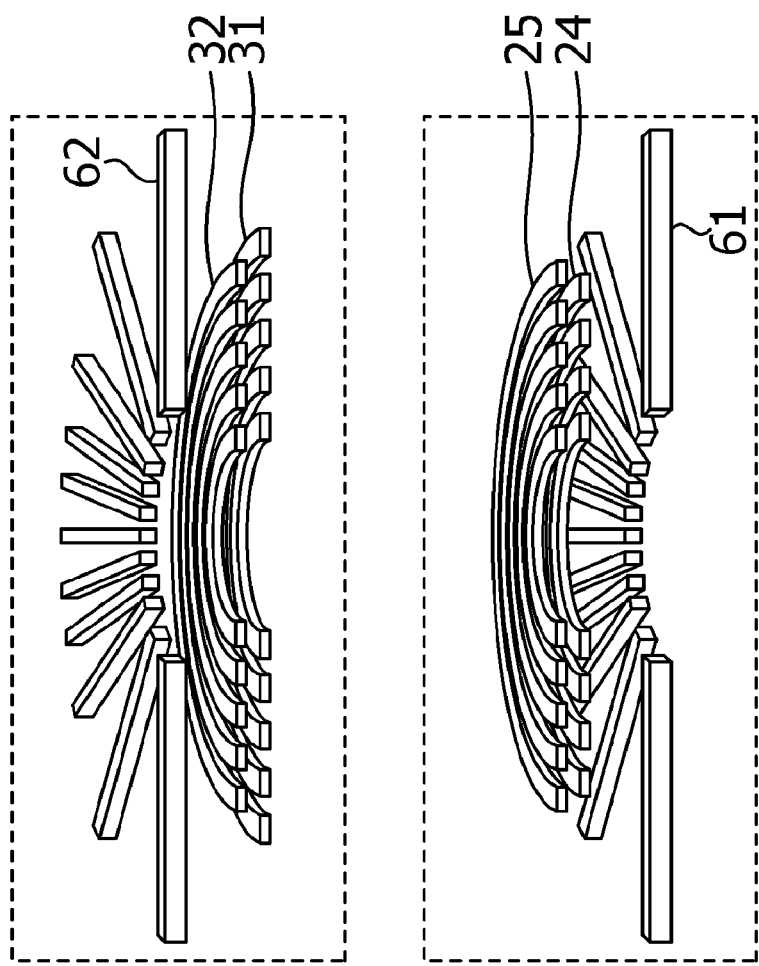
FIG. 6 illustrates a structure including an electromagnetic induction coil mounted between a radially arranged magnetic body and a magnetic resonance coil.

FIG. 6 illustrates a structure of a magnetic resonance coil arranged between a radially extending magnetic body and an electromagnetic induction coil. Referring to FIG. 6, each of the magnetic bodies 61 and 62 includes a plurality of radially extending bars. The power transmitting coil 24 and the power receiving coil 31 as magnetic resonance coils are arranged diagonally across from each other.

Referring to FIG. 6, the magnetic body 61 is arranged opposite the power receiving coil 31, as seen from the power transmitting coil 24, and parallel to the coil surfaces of the power transmitting coil 24. The power supplying coil 23 as an electromagnetic induction coil is arranged between the power transmitting coil 24 and the magnetic body 61. The magnetic body 62 is arranged opposite the power transmitting coils 24 as seen from the power receiving coil 31 and parallel to the coil surfaces of the power receiving coil 31. The power pickup coil 32 as an electromagnetic induction coil is arranged between the power receiving coil 31 and the magnetic body 62.

Figure 7:
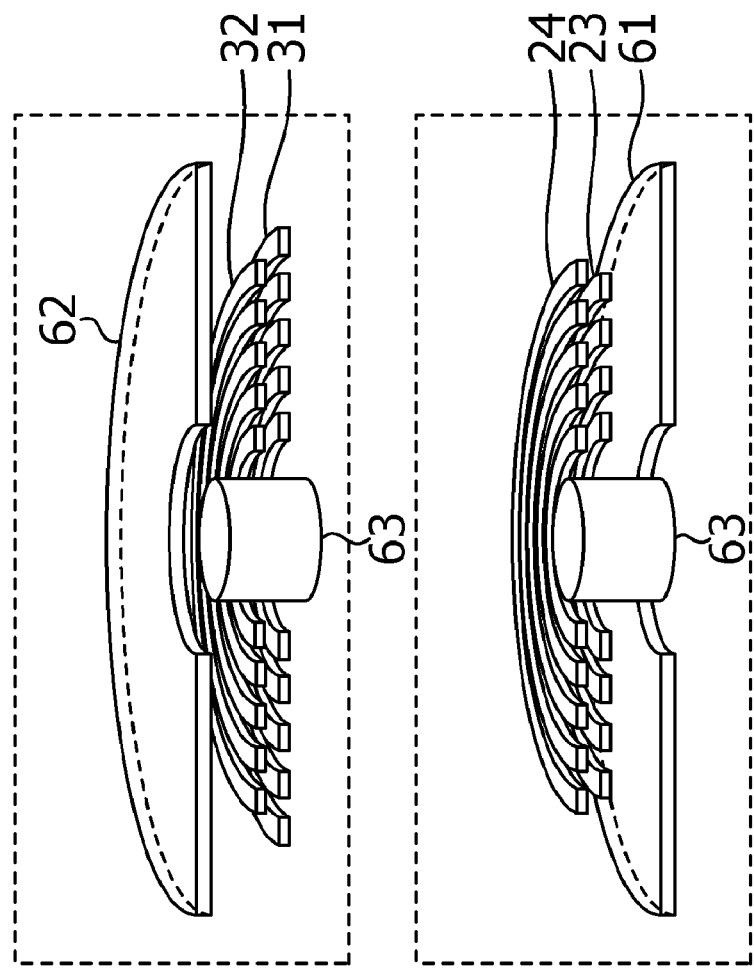
FIG. 7 illustrates ferrite cores added to the structure of FIG. 5.

FIG. 7 illustrates the structure of FIG. 5 with ferrite cores 63 added thereto. The ferrite core 63 passes through the aperture of the magnetic body 61, the power supplying coil 23, and the power transmitting coil 24 and is substantially perpendicular to the power transmitting coil 24. Another ferrite core 63 passes through the aperture of the magnetic body 62, the power pickup coil 32, and the power receiving coil 31 and is substantially perpendicular to the power receiving coil 31.

Figure 8:
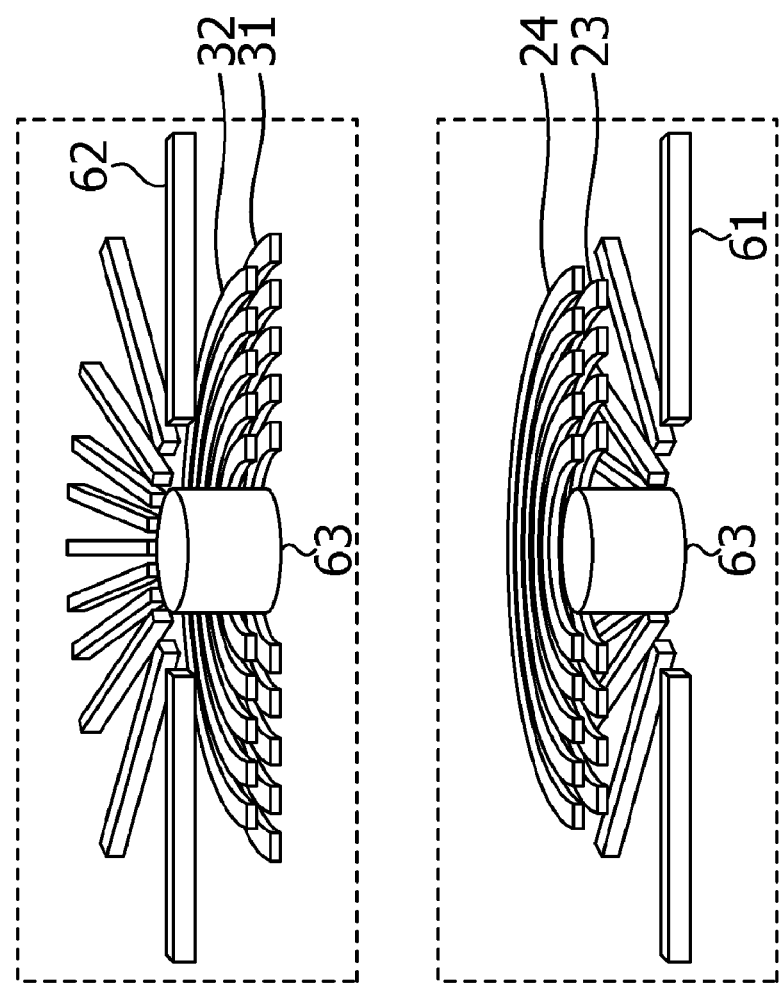
FIG. 8 illustrates ferrite cores added to the structure of FIG. 6.

FIG. 8 illustrates the structure of FIG. 6 with ferrite cores 63 added thereto. The ferrite core 63 passes through the center of the magnetic body 61, the power supplying coil 23, and the power transmitting coil 24 and is substantially perpendicular to the power transmitting coil 24. Another ferrite core 63 passes through the center of the magnetic body 62, the power pickup coil 32, and the power receiving coil 31 and is substantially perpendicular to the power receiving coil 31.

Figure 9:
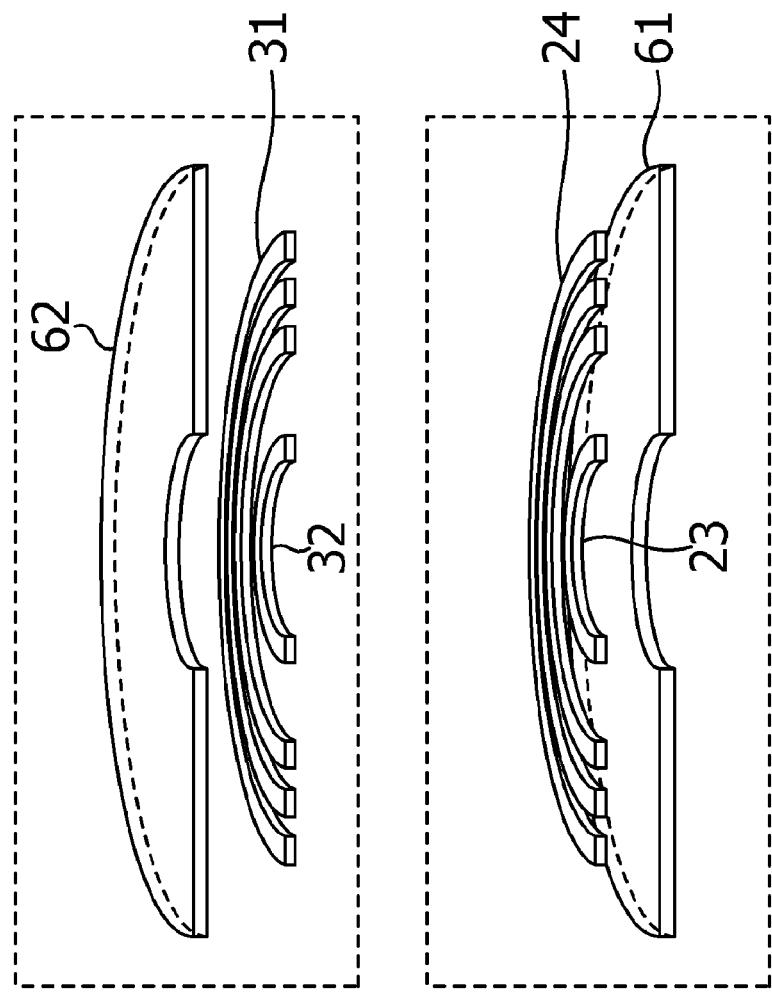
FIG. 9 illustrates a structure including a magnetic disk having an aperture and an electromagnetic induction coil inside a magnetic resonance coil.

FIG. 9 illustrates a structure including a disk magnetic body having an aperture and an electromagnetic induction coil inside the curvature of a magnetic resonance coil. Referring to FIG. 9, each of the magnetic bodies 61 and 62 is a disk configuration having an aperture at the center thereof. The power transmitting coil 24 and the power receiving coil 31, as magnetic resonance coils, are arranged diagonally across from each other.

Referring to FIG. 9, the magnetic body 61 is arranged opposite the power receiving coil 31, as seen from the power transmitting coil 24, and parallel to the coil surfaces of the power transmitting coil 24. The power supplying coil 23 as an electromagnetic induction coil is co-planar with the power transmitting coil 24 and inside the curvature of the power transmitting coil 24. The magnetic body 62 is arranged opposite the power transmitting coil 24, as seen from the power receiving coil 31, and parallel to the coil surfaces of the power receiving coil 31. The power pickup coil 32 as an electromagnetic induction coil is co-planar with the power receiving coil 31 and inside the curvature of the power receiving coil 31.

Figure 10:
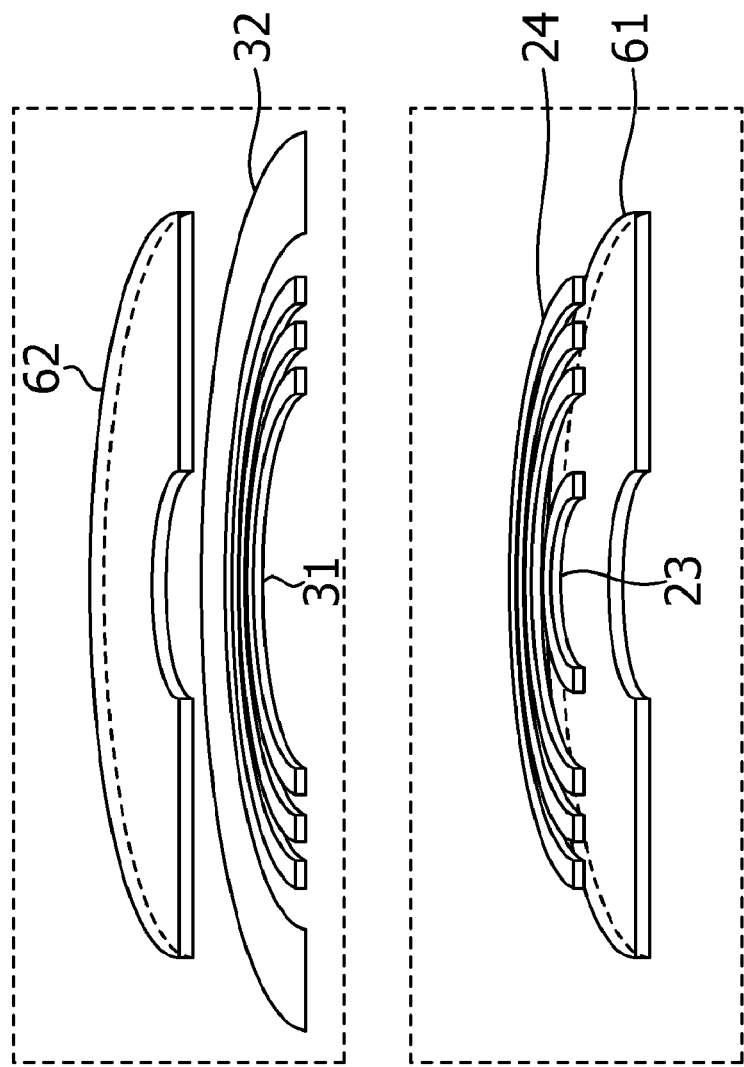
FIG. 10 illustrates a structure including a magnetic disk having an aperture and an electromagnetic induction coil outside a magnetic resonance coil.

FIG. 10 illustrates a structure including a disk magnetic body having an aperture and an electromagnetic induction coil outside the curvature of a magnetic resonance coil. Referring to FIG. 10, the power pickup coil 32 as an electromagnetic induction coil is arranged co-planar with and outside the curvature of the power receiving coil 31. As illustrated in FIG. 10, the power pickup coil 32 is arranged outside the curvature while the power supplying coil 23 is arranged inside the curvature of the corresponding coil. Alternatively, both the power pickup coil 32 and the power supplying coil 23 may be arranged outside the curvature of the power receiving coil 31 and the power transmitting coil 24 respectively. Alternatively, the power pickup coil 32 may be arranged inside the curvature of the power receiving coil 31 while the power supplying coil 23 may be arranged outside the curvature of the power transmitting coil 24.

Figure 11:
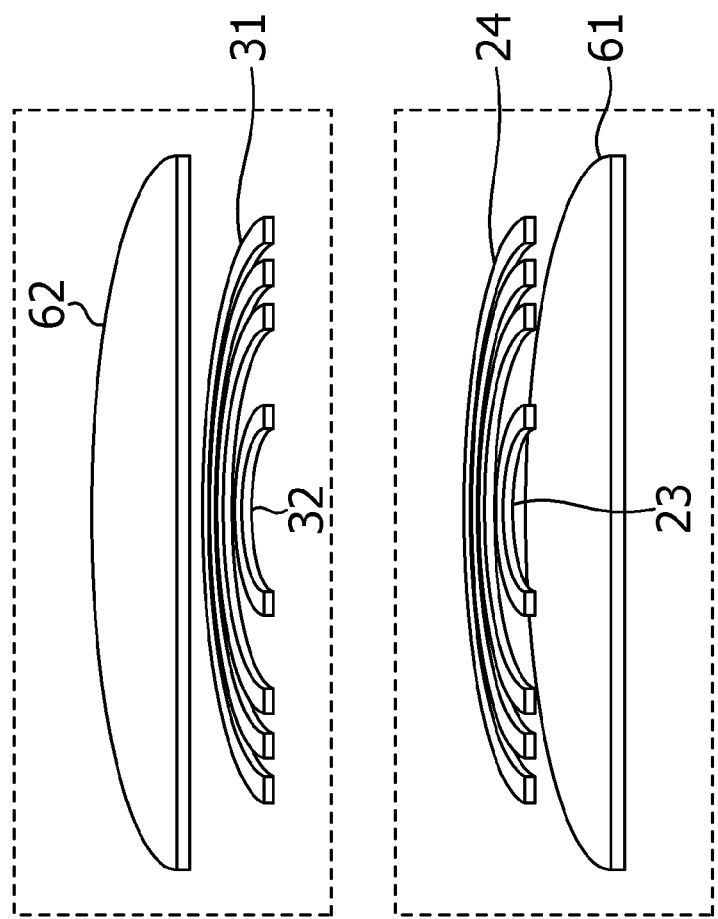
FIG. 11 illustrates a structure including a magnetic disk.

FIG. 11 illustrates a structure of a disk magnetic body. The magnetic body 61 illustrated in FIG. 11 has no aperture at the center thereof while the magnetic body 61 illustrated in FIG. 9 has a central aperture. It is noted that the disk magnetic body having no aperture may be substituted for each of the disk magnetic bodies of FIGS. 5, 7, and 10. The disk magnetic body is desirably segmented into a plurality of portions with insulators in order to reduce an eddy current loss during a high-frequency driving operation.

Figure 12:
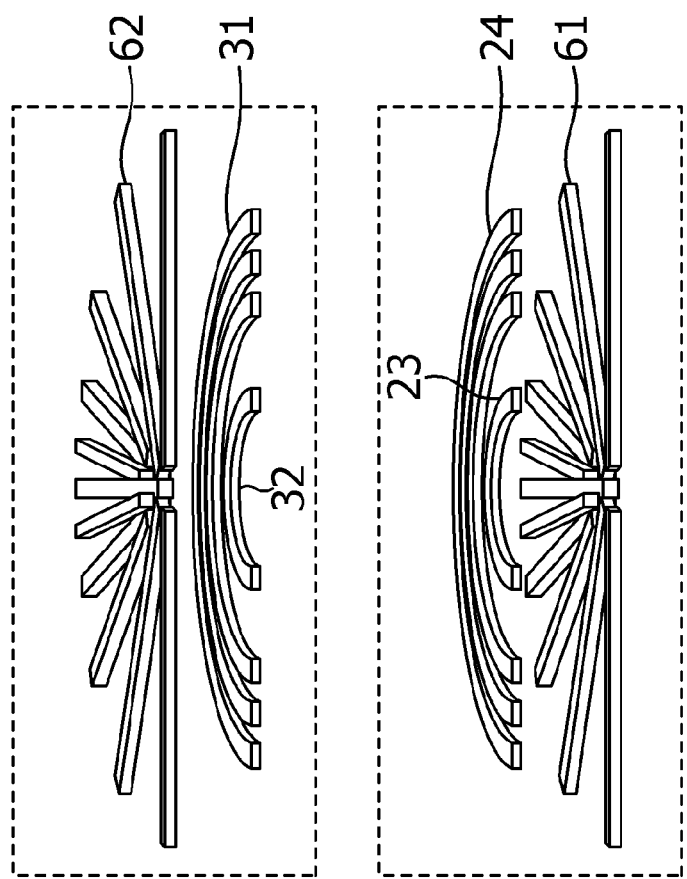
FIG. 12 illustrates a structure including a magnetic body radially arranged and an electromagnetic induction coil inside a magnetic resonance coil.

FIG. 12 illustrates a structure including radially arranged magnetic bars and an electromagnetic induction coil inside the curvature of a magnetic resonance coil. Referring to FIG. 12, each of the magnetic bodies 61 and 62 includes a plurality of bars radially extending and connected at the center ends thereof. The power transmitting coil 24 and the power receiving coil 31, as magnetic resonance coils, are arranged diagonally across from each other.

Referring to FIG. 12, the magnetic body 61 is arranged opposite the power receiving coil 31, as seen from the power transmitting coil 24, and parallel to the coil surfaces of the power transmitting coil 24. The power supplying coil 23 as an electromagnetic induction coil is arranged co-planar with and inside the curvature of the power transmitting coil 24. The magnetic body 62 is arranged opposite the power transmitting coil 24, as seen from the power receiving coil 31, and parallel to the coil surfaces of the power receiving coil 31. The power pickup coil 32 as an electromagnetic induction coil is arranged co-planar with and inside the curvature of the power receiving coil 31. The power supplying coil 23 and the power pickup coil 32 are arranged inside the curvatures of the corresponding coils. Alternatively, the power supplying coil 23 and/or the power pickup coil 32 may be arranged outside the curvatures of the corresponding coils.

Figure 13:
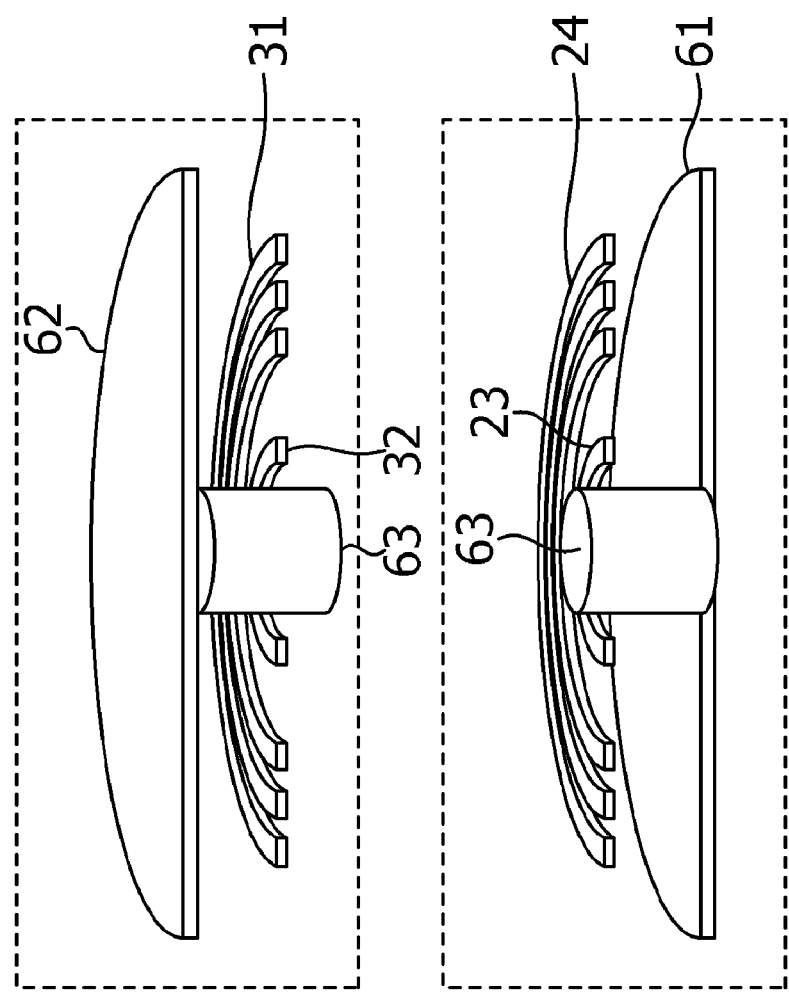
FIG. 13 illustrates a structure in which a ferrite core is added to the structure of FIG. 11.

FIG. 13 illustrates the structure of FIG. 11 with ferrite cores 63 attached thereto. One ferrite core 63 extends from the center of the magnetic body 61, passing through the power supplying coil 23, and the power transmitting coil 24, and is substantially perpendicular to the power transmitting coil 24. The other ferrite core 63 extends from the center of the magnetic body 62, passing through the power pickup coil 32 and the power receiving coil 31 and is substantially perpendicular to the power receiving coil 31.

Figure 14:
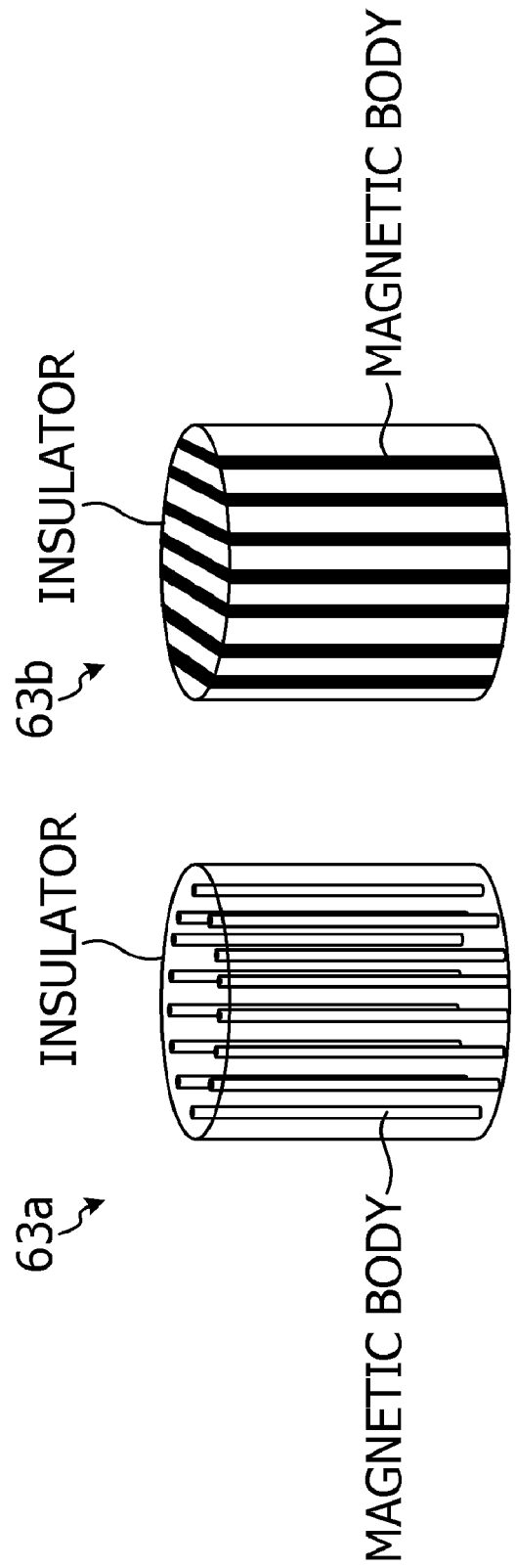
FIG. 14 illustrates modified ferrite cores.

FIG. 14 illustrates a modification of the ferrite core. The body of the ferrite core 63 may be constructed of a magnetic material. Alternatively, ferrite cores 63*a* and 63*b* including a plurality of magnetic segments arranged in an insulator may be used. The ferrite core 63*a* includes a plurality of magnetic bars arranged substantially perpendicular to the coil surfaces of the magnetic resonance coil. The ferrite core 63*b* includes a plurality of magnetic plates arranged substantially perpendicular to the coil surfaces of the magnetic resonance coil.

Figure 15:
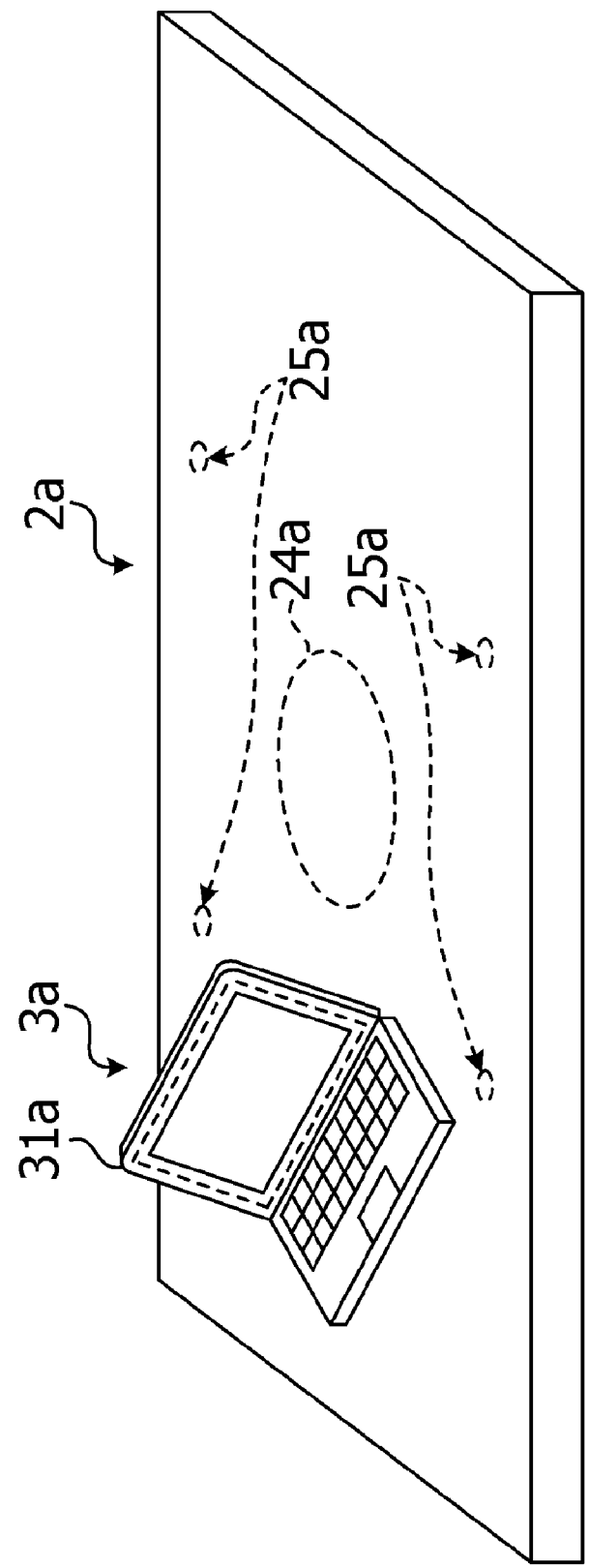
FIG. 15 illustrates a table as a power transmitting unit and a portable computer as a power receiving unit.

Application examples of the power transfer apparatus 1 are described below. FIG. 15 illustrates an application example of the power transfer apparatus 1 in which a table 2*a* serves as the power transmitting device 2 and a mobile computer 3*a* serves as the power receiving device 3. Referring to FIG. 15, the table 2*a* includes a power transmitting coil 24*a* and a sensor 25*a* embedded in a top plate thereof. The mobile computer 3*a* includes a power receiving coil 31 embedded in a display frame structure thereof. The mobile computer 3*a* is wirelessly power-supplied by the table 2*a*.

Figure 16:
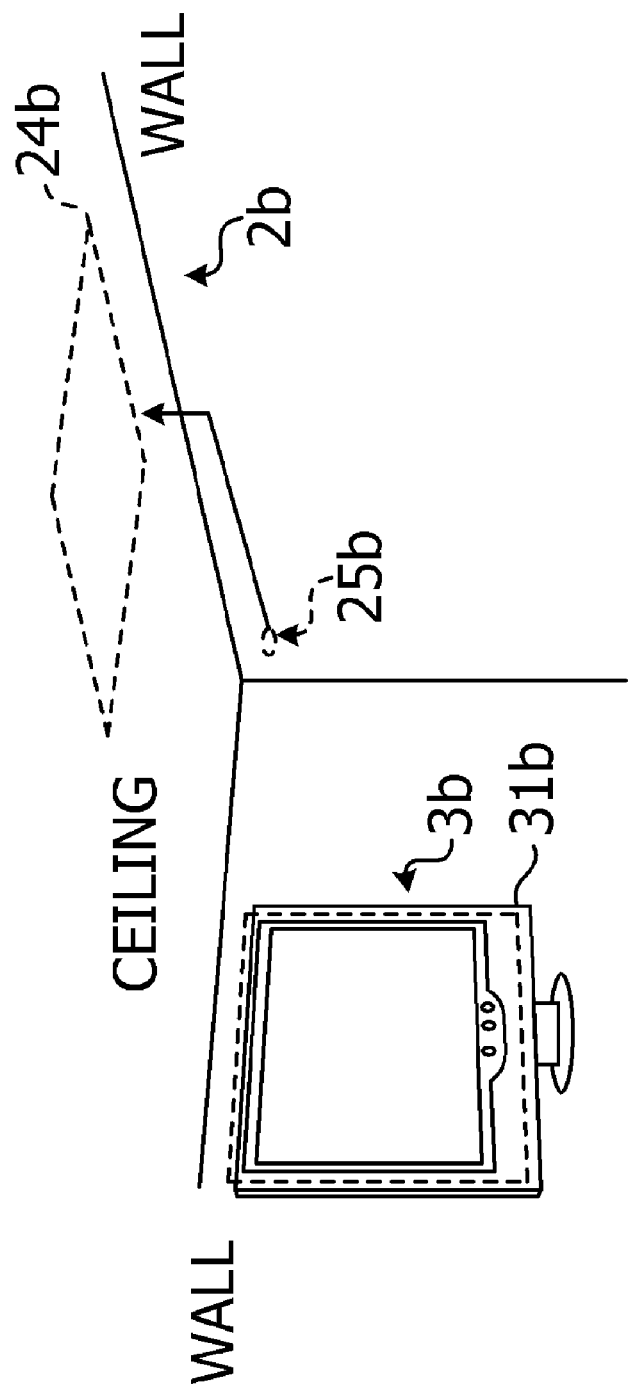
FIG. 16 illustrates a power transmitting device embedded in the wall and ceiling, and a flat television receiver as a power receiving device.

FIG. 16 illustrates an application example of the power transfer apparatus 1 in which the power transmitting device 2 is embedded in the ceiling and a flat television serves as the power receiving device 3. Referring to FIG. 16, a power transmitting coil 24*b* is embedded in the ceiling, a sensor 25*b* is embedded in the wall, and a power receiving coil 31*b* is embedded in a frame structure of a flat television 3*b*. The flat television 31*b* is wirelessly power-supplied by a power transmitting coil 24*b* in the ceiling.

In the power transfer apparatus 1 of the present embodiment as previously discussed, the power transmitting coil 24 and the power receiving coil 31, serving as the magnetic resonance coils, have directivity, and the magnetic bodies 61 and 62 are arranged so that the directivities are aligned. The power transfer efficiency is thus increased. Since the power transmitting coil 24 and the power receiving coil 31 have directivity, the magnetic field is set to be weak in a direction other than the magnetic energy transfer direction. The adverse effects of the magnetic field on the surrounding objects are reduced.

The embodiment has been discussed for exemplary purposes only. The technique discussed here may be changed or modified. Each of the power transmitting device 2 and the power receiving device 3 in the embodiment has the magnetic body thereof. Alternatively, only one of the power transmitting device 2 and the power receiving device 3 may include a magnetic body. A magnetic field directivity is obtained on the magnetic body loaded side, and even if a resonance destination is free from directivity with no magnetic body arranged thereon, the coupling efficiency K of the magnetic fields may be still increased.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

The invention claimed is:

1. A power transfer apparatus comprising:
   a magnetic resonance coil for transferring magnetic energy by magnetically resonating with a power supplying coil;
   a power pickup coil for picking up, as electrical power, the magnetic energy that the magnetic resonance coil receives from the power supplying coil; and
   a first magnetic body arranged on a first side of the magnetic resonance coil opposite to a second side of the magnetic resonance coil in which the power pickup coil is located.

2. The power transfer apparatus according to claim 1, wherein the power pickup coil is in electromagnetic induction with the magnetic resonance coil and is arranged between a second magnetic body and the magnetic resonance coil.

3. The power transfer apparatus according to claim 1, wherein the power pickup coil is in electromagnetic induction with the magnetic resonance coil and is arranged in a location substantially coplanar with a location of the magnetic resonance coil.

4. The power transfer apparatus according to claim 3, wherein the power pickup coil is in electromagnetic induction with the magnetic resonance coil and is arranged in a location inside a curvature of the magnetic resonance coil.

5. A power transfer apparatus comprising:
   a magnetic resonance coil for transferring magnetic energy by magnetically resonating with a power receiving coil;
   a power pickup coil for supplying electrical power as the magnetic energy that the magnetic resonance coil transmits to the power receiving coil; and
   a first magnetic body arranged on a first side of the magnetic resonance coil opposite to a second side of the magnetic resonance coil in which the power pickup coil is located.

6. The power transfer apparatus according to claim 5, wherein the power pickup coil is in electromagnetic induction with the magnetic resonance coil and is arranged between a second magnetic body and the magnetic resonance coil.

7. The power transfer apparatus according to claim 5, wherein the power pickup coil is in electromagnetic induction with the magnetic resonance coil and is arranged in a location substantially co-planar with a location of the magnetic resonance coil.

8. The power transfer apparatus according to claim 7, wherein the power pickup coil is in electromagnetic induction with the magnetic resonance coil and is arranged in a location inside a curvature of the magnetic resonance coil.

9. The power transfer apparatus according to claim 1, wherein the first magnetic body comprises a plurality of bars extending radially and positioned parallel to the magnetic resonance coil.

10. The power transfer apparatus according to claim 1, further comprising a ferrite core arranged in the center of the first magnetic body and extending substantially perpendicular to the magnetic resonance coil wherein the first magnetic body includes a magnetic sheet disk extending parallel to the magnetic resonance coil.

11. The power transfer apparatus according to claim 10, wherein at least one of the first magnetic body and the ferrite core has a magnetic portion segmented with insulators.

12. The power transfer apparatus according to claim 5, wherein the first magnetic body comprises a plurality of bars extending radially and positioned parallel to the magnetic resonance coil.

13. The power transfer apparatus according to claim 5, further comprising a ferrite core arranged in the center of the first magnetic body and extending substantially perpendicular to the magnetic resonance coil wherein the first magnetic body includes a magnetic sheet disk extending parallel to the magnetic resonance coil.

14. The power transfer apparatus according to claim 13, wherein at least one of the first magnetic body and the ferrite core has a magnetic portion segmented with insulators.

* * * * *